US008593802B1

(12) United States Patent
Strauser

(10) Patent No.: US 8,593,802 B1
(45) Date of Patent: Nov. 26, 2013

(54) TRI-HOLDER/ORGANIZER SYSTEM

(76) Inventor: John E. Strauser, Largo, FL (US)

( * ) Notice: Subject to any disclaimer, the term of this patent is extended or adjusted under 35 U.S.C. 154(b) by 202 days.

(21) Appl. No.: 13/373,076

(22) Filed: Nov. 3, 2011

(51) Int. Cl.
*G06F 1/16* (2006.01)
(52) U.S. Cl.
USPC ............... 361/679.3; 361/679.41; 361/807; 369/30.06
(58) Field of Classification Search
USPC .............. 369/30.06; 361/679.41, 679.3, 807
See application file for complete search history.

(56) References Cited

U.S. PATENT DOCUMENTS

| 6,524,240 | B1 * | 2/2003 | Thede | 600/300 |
|---|---|---|---|---|
| D579,443 | S * | 10/2008 | Donovan et al. | D14/217 |
| D589,930 | S * | 4/2009 | McGeeney | D14/172 |
| D595,722 | S * | 7/2009 | Miyawaki | D14/447 |
| D600,251 | S * | 9/2009 | Poandl | D14/496 |
| 7,853,745 | B2 * | 12/2010 | Muraki | 710/303 |
| 8,054,042 | B2 * | 11/2011 | Griffin et al. | 320/115 |
| 8,115,451 | B2 * | 2/2012 | Griffin, Jr. | 320/115 |
| 8,311,256 | B1 * | 11/2012 | Strauser | 381/365 |
| 8,320,597 | B2 * | 11/2012 | Griffin et al. | 381/339 |
| 2007/0058332 | A1 * | 3/2007 | Canterbury et al. | 361/683 |
| 2007/0291475 | A1 * | 12/2007 | Heathcock | 362/157 |
| 2009/0009957 | A1 * | 1/2009 | Crooijmans et al. | 361/686 |
| 2009/0129010 | A1 * | 5/2009 | Park et al. | 361/679.56 |
| 2009/0295328 | A1 * | 12/2009 | Griffin, Jr. | 320/115 |
| 2010/0195279 | A1 * | 8/2010 | Michael | 361/679.41 |
| 2011/0216495 | A1 * | 9/2011 | Marx | 361/679.22 |
| 2012/0014056 | A1 * | 1/2012 | Chen et al. | 361/679.41 |
| 2012/0106069 | A1 * | 5/2012 | Strauser | 361/679.41 |

* cited by examiner

*Primary Examiner* — Hoa C Nguyen
*Assistant Examiner* — Robert Brown

(57) ABSTRACT

A plurality of stations is positionable on the top of a stereo radio/alarm clock. The stations include end stations and a central station between the end stations. Each station has a downwardly extending recess to removably receive and support a smaller consumer electronic music device. Each station has a support plate extending upwardly from an associated recess. The end recesses are laterally aligned with their associated support plates in a forward plane. The central recess is rearwardly spaced from the end recesses with its associated support plate in a rearward plane. The arrangement of the support plates allows the support plates to removably receive and support a larger consumer electronic music device.

5 Claims, 6 Drawing Sheets

TRI-HOLDER/ORGANIZER SYSTEM

BACKGROUND OF THE INVENTION

Field of the Invention

The present invention relates to a tri-holder/organizer system and more particularly pertains to holding and removably supporting a plurality of consumer electronic music devices in proximity to and operatively coupled with a stereo radio/alarm clock, the holding and supporting and coupling being done in a safe, convenient and economical manner.

SUMMARY OF THE INVENTION

In view of the disadvantages inherent in the known types of organizer systems of known designs and configurations now present in the prior art, the present invention provides an improved tri-holder/organizer system. As such, the general purpose of the present invention, which will be described subsequently in greater detail, is to provide a new and improved tri-holder/organizer system and method which has all the advantages of the prior art and none of the disadvantages.

To attain this, the present invention essentially comprises a tri-holder/organizer system. First provided is a stereo radio/alarm clock. The stereo radio/alarm clock has a top, a bottom, a forward region, a rearward region and opposed sides. The stereo radio/alarm clock has speakers. The speakers are provided adjacent to the sides. In this manner sounds are generated. The sounds include music. The stereo radio/alarm clock has controls. The controls are provided on the top adjacent to the forward region. The stereo radio/alarm clock has a plurality of ports. The ports are provided in the rearward region. The stereo radio/alarm clock has a screen. The screen is provided on the forward region.

A plurality of consumer electronic music devices is provided next. The consumer electronic music devices are chosen from the class of consumer electronic music devices. The class of consumer electronic music devices includes, but is not limited to, MP3s and MP4s and large tablets, the MP3s and MP4s and large tablets. The MP3s and MP4s constitute smaller consumer electronic music devices. The large tablets constitute larger consumer electronic music device.

Further provided is a plurality of similarly configured stations. The stations are formed in the top of the stereo radio/alarm clock adjacent to the rearward region. The stations include end stations. The end stations are adjacent to the sides. The stations include a central station. The central station is provided midway between the end stations. Each station has a downwardly extending rectilinear recess. The downwardly extending rectilinear recess is provided forwardly. Each recess has parallel rectangular front and rear surfaces. The front and rear surfaces are spaced by a length. The length is between 1.6 and 1.8 centimeters. Each recess has parallel polygonal side surfaces. The side surfaces are spaced by a width. The width is between 5 and 7 centimeters. Each recess has a rectangular closed lower surface. Each recess has a rectangular open upper surface. The lower and upper surfaces are spaced by a depth of between 0.5 and 1.5 centimeters. Each lower surface has an elongated aperture. Each recess is adapted to removably receive and support a smaller electronic music device. Each recess is formed to support an associated consumer electronic music device. The associated consumer electronic music device is rearwardly offset from the vertical by between 5 and 15 degrees.

Each station has a support plate. Each support plate has a width. The width is equal to the width of an associated recess. Each support plate has a height. The height is between 2 and 4 centimeters. Each support plate has front and rear faces. The front and rear surfaces are separated by a thickness. Each support plate extends upwardly from the rear surface of an associated recess. Each support plate is offset from the vertical by between 5 and 15 degrees.

The end recesses are laterally aligned with their associated support plates in a forward plane. The central recess are rearwardly spaced from the end recesses. The associated support plate is in a rearward plane. The forward and rearward planes are spaced by between 2.4 and 2.6 centimeters. The forward and rearward planes are adapted to removably receive and support a larger consumer electronic music device. An iPOD is offset from the vertical by between 5 and 15 degrees. The arrangement of recesses and support plates, with the rearward back surfaces of the side support plates and the forward front surface of the center support plate, is adapted to allow the stereo radio/alarm clock to removably receive and support a larger consumer electronic music device rearwardly and a plurality of smaller consumer electronic music devices forwardly and or rearwardly.

Provided last is a plurality of cables. Each cable has an upper end. The upper end is fished through the aperture at the bottom of the recess and is coupled to an associated consumer electronic music device. Each cable has a lower end. The lower end is coupled to the stereo radio/alarm clock through the ports. Each cable has a central section. The central section extends through a associated aperture in an associated recess.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tri-holder/organizer system which has all of the advantages of the prior art organizer systems of known designs and configurations and none of the disadvantages.

It is another object of the present invention to provide a new and improved tri-holder/organizer system which may be easily and efficiently manufactured and marketed.

It is further object of the present invention to provide a new and improved tri-holder/organizer system which is of durable and reliable constructions.

An even further object of the present invention is to provide a new and improved tri-holder/organizer system which is susceptible of a low cost of manufacture with regard to both materials and labor, and which accordingly is then susceptible of low prices of sale to the consuming public, thereby making such tri-holder/organizer system economically available to the buying public.

Even still another object of the present invention is to provide a tri-holder/organizer system for holding and removably supporting a plurality of consumer electronic music devices in proximity to and operatively coupled with a stereo radio/alarm clock, the holding and supporting and coupling being done in a safe, convenient and economical manner.

Lastly, it is an object of the present invention to provide a new and improved tri-holder/organizer system. A plurality of stations is positionable on the top of a stereo radio/alarm clock. The stations include two end stations and a single central station between the end stations. Each station has a downwardly extending recess adapted to removably receive and support a smaller consumer electronic music device. Each station has a support plate extending upwardly from an associated recess. The end recesses are laterally aligned with their associated support plates in a forward plane. The central recess is rearwardly spaced from the end recesses with its associated support plate in a rearward plane. The arrangement of the support plates is adapted to allow the support plates to removably receive and support a larger consumer electronic music device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
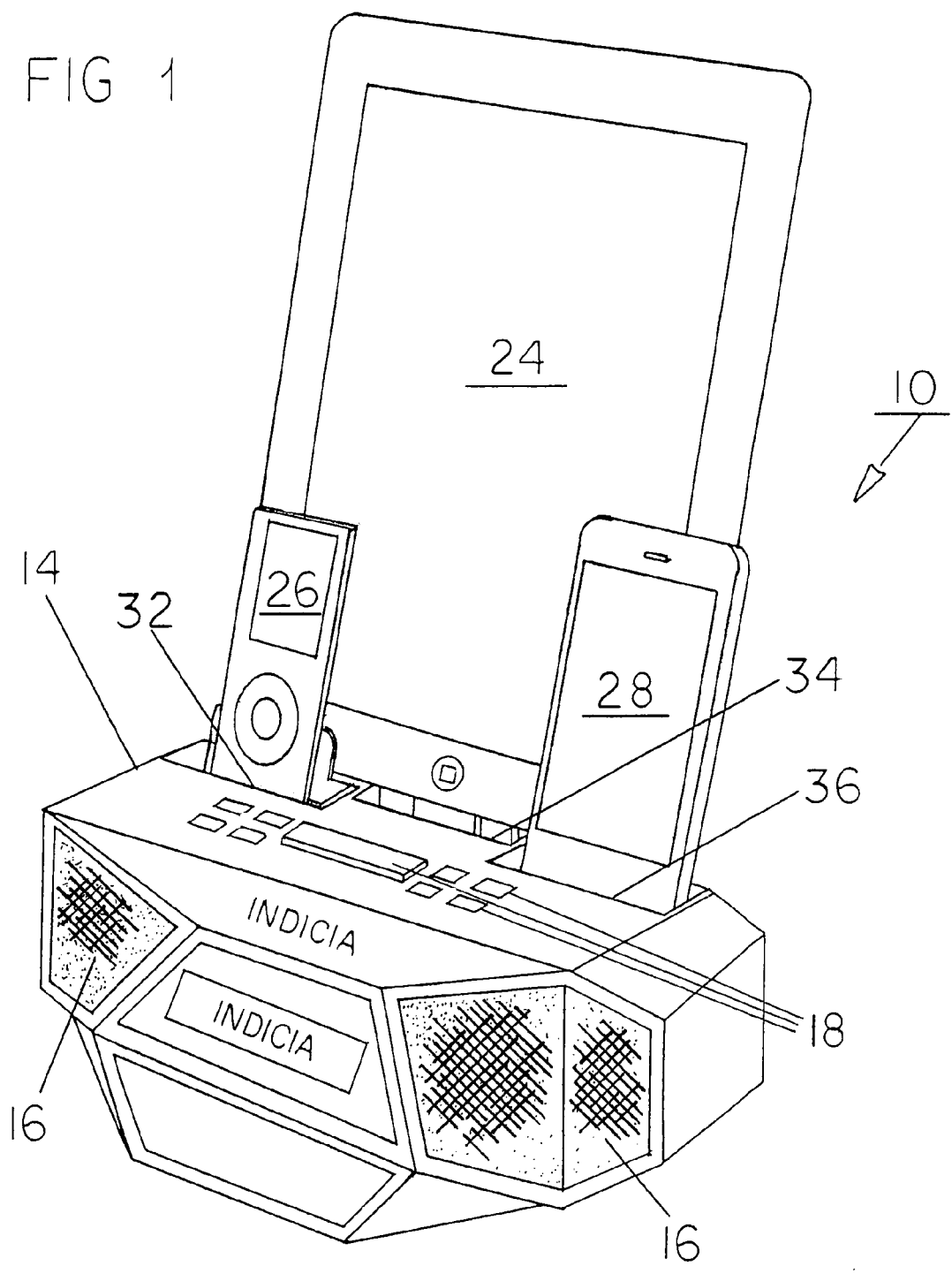
FIG. 1 is a perspective illustration of a tri-holder/organizer system constructed in accordance with the principles of the present invention.
Figure 2:
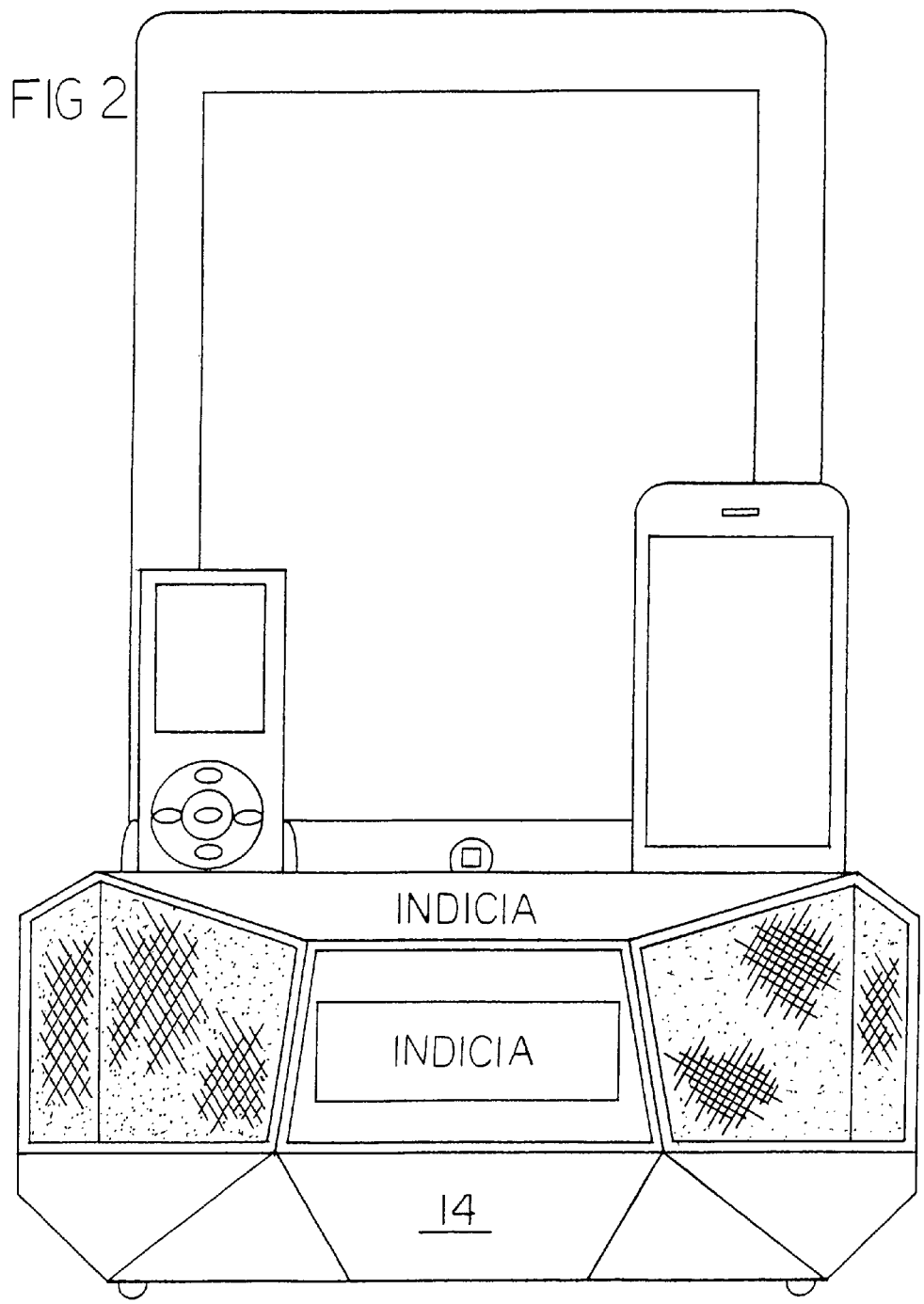
FIGS. 2, 3, 4 and 5 are elevational views taken from the front, top, back and side of the system illustrated in FIG. 1.
Figure 3:
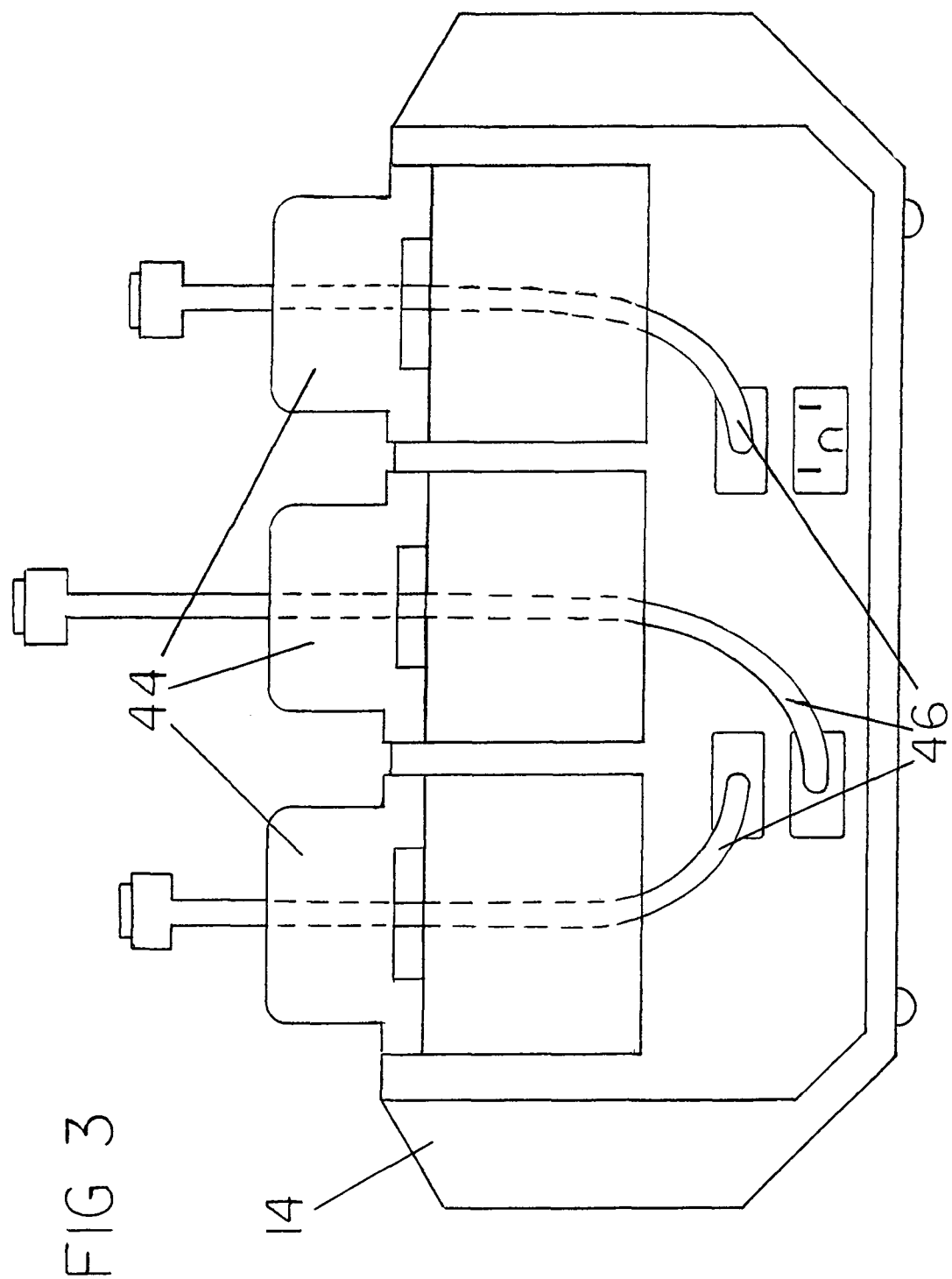
Figure 4:
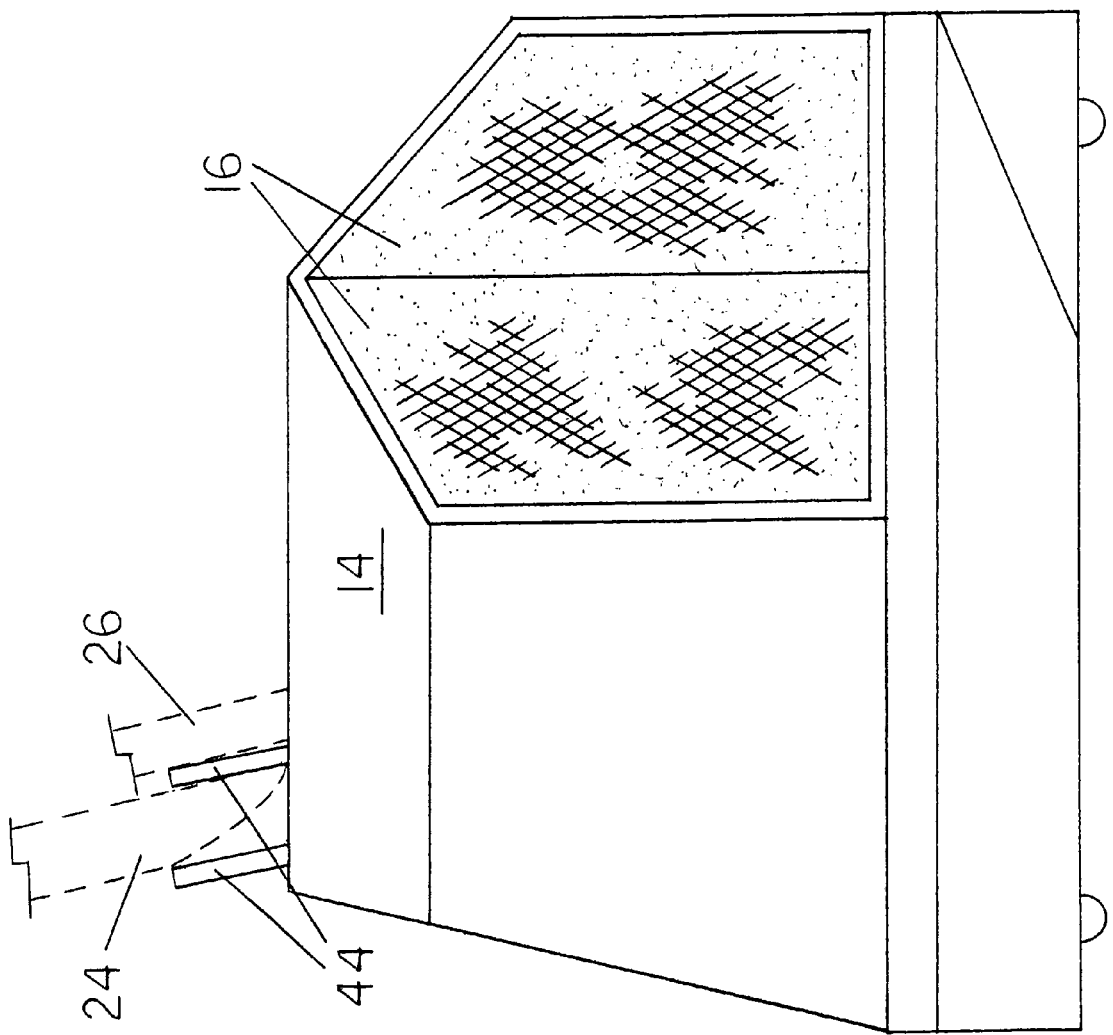
Figure 5:
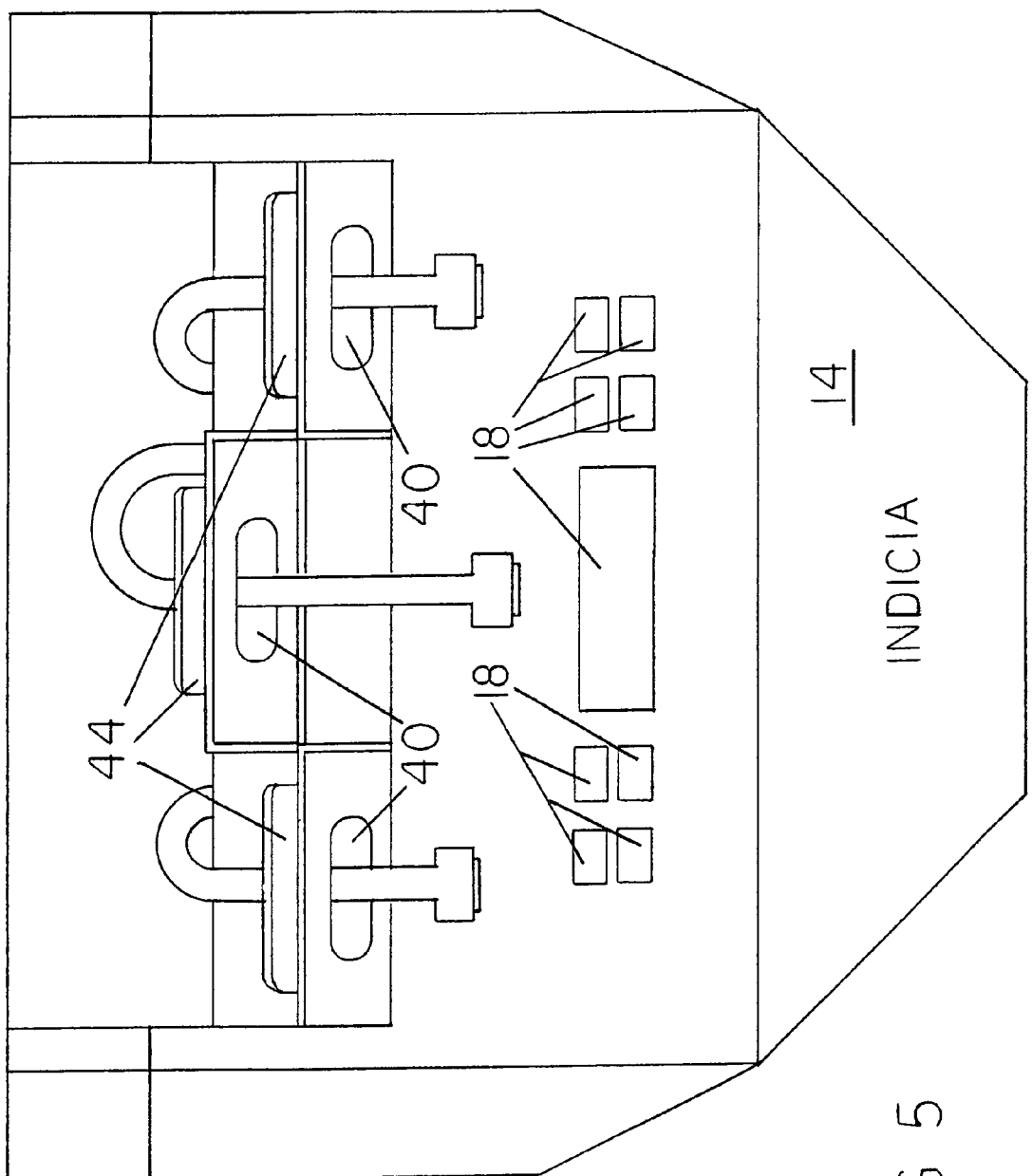
Figure 6:
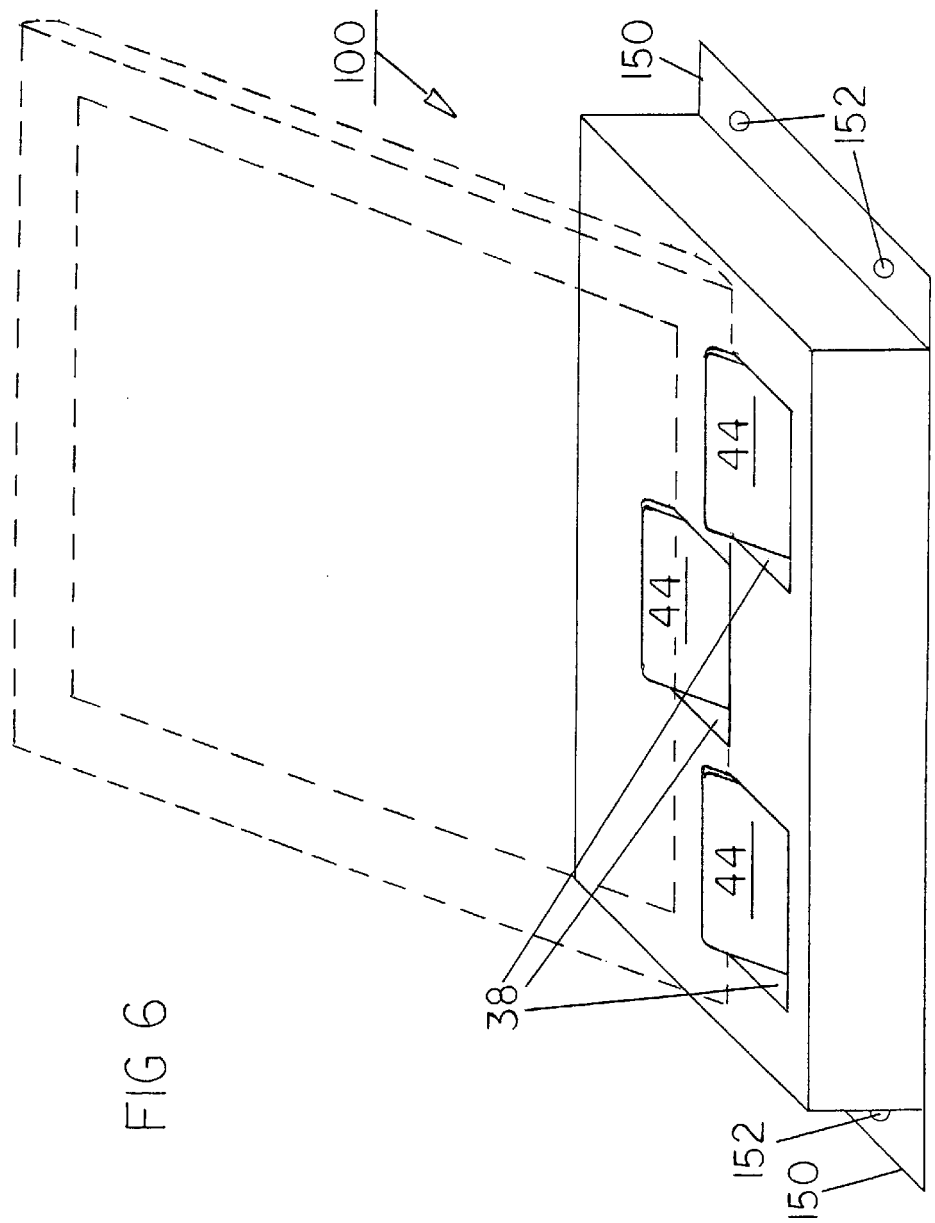
FIG. 6 a perspective illustration of a tri-holder/organizer system constructed in accordance with an alternate embodiment of the invention.

With reference now to the drawings, and in particular to FIG. 1 thereof, the preferred embodiment of the new and improved tri-holder/organizer system embodying the principles and concepts of the present invention and generally designated by the reference numeral 10 will be described.

The present invention, the tri-holder/organizer system 10 is comprised of a plurality of components. Such components in their broadest context include a plurality of stations. Such components are individually configured and correlated with respect to each other so as to attain the desired objective.

First provided is a stereo radio/alarm clock 14. The stereo radio/alarm clock has a top, a bottom, a forward region, a rearward region and opposed sides. The stereo radio/alarm clock has speakers 16. The speakers are provided adjacent to the sides. In this manner sounds are generated. The sounds include music. The stereo radio/alarm clock has controls 18. The controls are provided on the top adjacent to the forward region. The stereo radio/alarm clock has a plurality of ports 20. The ports are provided in the rearward region. The stereo radio/alarm clock has a screen. The screen is provided on the forward region.

A plurality of consumer electronic music devices 24, 26, 28 is provided next. The consumer electronic music devices are chosen from the class of consumer electronic music devices. The class of consumer electronic music devices includes, but is not limited to, MP3s and MP4s and large tablets. The MP3s and MP4s constitute smaller consumer electronic music devices. The large tablets constitute a larger consumer electronic music device.

Further provided is a plurality of similarly configured stations 32, 34, 36. The stations are formed in the top of the stereo radio/alarm clock adjacent to the rearward region. The stations include end stations 32, 36. The end stations are adjacent to the sides. The stations include a central station 34. The central station is provided midway between the end stations. Each station has a downwardly extending rectilinear recess 38. The downwardly extending rectilinear recess is provided forwardly. Each recess has parallel rectangular front and rear surfaces. The front and rear surfaces are spaced by a length. The length is between 1.6 and 1.8 centimeters. Each recess has parallel polygonal side surfaces. The side surfaces are spaced by a width. The width is between 5 and 7 centimeters. Each recess has a rectangular closed lower surface. Each recess has a rectangular open upper surface. The lower and upper surfaces are spaced by a depth of between 0.5 and 1.5 centimeters. Each lower surface has an elongated aperture 40. Each recess is adapted to removably receive and support a smaller electronic music device. Each recess is formed to support an associated consumer electronic music device. The associated consumer electronic music device is rearwardly offset from the vertical by between 5 and 15 degrees.

Each station has a support plate 44. Each support plate has a width. The width is equal to the width of an associated recess. Each support plate has a height. The height is between 2 and 4 centimeters. Each support plate has front and rear faces. The front and rear surfaces are separated by a thickness. Each support plate extends upwardly from the rear surface of an associated recess. Each support plate is offset from the vertical by between 5 and 15 degrees.

The end recesses are laterally aligned with their associated support plates in a forward plane. The central recess are rearwardly spaced from the end recesses. The associated support plate is in a rearward plane. The forward and rearward planes are spaced by between 2.4 and 2.6 centimeters. The forward and rearward planes are adapted to removably receive and support a larger consumer electronic music device. An IPOD® computerized data storage and retrieval device is offset from the vertical by between 5 and 15 degrees. The arrangement of recesses and support plates, with the rearward back surfaces of the side support plates and the forward front surface of the center support plate, is adapted to allow the stereo radio/alarm clock to removably receive and support a larger consumer electronic music device rearwardly and a plurality of smaller consumer electronic music devices forwardly and or rearwardly.

Provided last is a plurality of cables 46. Each cable has an upper end. The upper end is coupled to an associated consumer electronic music device. Each cable has a lower end. The lower end is coupled to the stereo radio/alarm clock through the ports. Each cable has a central section. The central section extends through a associated aperture in an associated recess.

The tri-holder/organizer is a multi-holding storage system for holding and charging different types of mp3s, mp4s, larger tablets or larger video devices, while using loose separate charging cords to charge each one of the devices.

The inventive system includes three similarly configured, different single recess lone gated cups/gutter stations, each station having a recess with an elongated aperture on the bottom. Each aperture is to fish a loose separate charging cord up through to connect to a device and then to place the device back onto the single lone gated cup and plug the device cord fitting through the elongated aperture for storage and charging.

The tri-holder system is three individual separate single recess lone gated stations, each with an upstanding support plate. The center station is staggered behind the two outside end stations by 2.5 cm. The reason for staggering the center station is to fit a larger tablet or larger video device in front of the center support plate and behind the other two side end support plates. This is used to fit the large tablet device behind the two end support plates as a block for the front face of the tablet device and with the front of the center rearward support plate as a block for the rear face of the large tablet so that the large tablet will not fall backwards. The large tablet is thus held firmly into the vertical position between the support plates of the end stations and the support plate of the center station.

The overall invention is to charge/hold all three devices at the same time into a small area in back of the stereo radio/alarm clock and keep all cords and devices neatly organized while charging overnight and not have so many different devices or cables having to be plug into a wall socket and scattered all over the room but put one system that will do the charging for all portable devices with the stereo radio/alarm clock all in one.

Reference is now made to the alternate embodiment 100 of the invention designed for existing stereo radio/alarm clocks in the aftermarket.

A stereo radio/alarm clock has a top, a bottom, a forward region, a rearward region and opposed sides. The stereo radio/alarm clock has speakers. The speakers are provided adjacent to the sides. In this manner sounds are generated. The sounds include music. The stereo radio/alarm clock has controls on the top adjacent to the forward region. The stereo radio/alarm clock has a plurality of ports in the rearward region. The stations have lateral supports 150. The lateral supports have screw holes 152. In this manner the lateral supports may be coupled to the top of the stereo radio/alarm clock.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tri-holder/organizer system comprising:
a plurality of stations positionable on the top of a stereo radio/alarm clock, the stations including end stations and a central station between the end stations, each station having a downwardly extending recess adapted to removably receive and support a smaller consumer electronic music device;
each station having a support plate extending upwardly from an associated recess;
the end recesses being laterally aligned with their associated support plates in a forward plane, the central recess being rearwardly spaced from the end recesses with its associated support plate in a rearward plane, the arrangement of the support plates adapted to allow the support plates to removably receive and support a larger consumer electronic music device;
wherein each recess is rectilinear, each recess having parallel rectangular front and rear surfaces spaced by a length of between 1.6 and 1.8 centimeters, each recess having parallel polygonal side surfaces spaced by a width of between 5 and 7 centimeters, each recess having a rectangular lower surface and a rectangular open upper surface spaced by a depth of between 0.5 and 1.5 centimeters, each lower surface having an elongated aperture.

2. A tri-holder/organizer system comprising:
a plurality of stations positionable on the top of a stereo radio/alarm clock, the stations including end stations and a central station between the end stations, each station having a downwardly extending recess adapted to removably receive and support a smaller consumer electronic music device;
each station having a support plate extending upwardly from an associated recess;
the end recesses being laterally aligned with their associated support plates in a forward plane, the central recess being rearwardly spaced from the end recesses with its associated support plate in a rearward plane, the arrangement of the support plates adapted to allow the support plates to removably receive and support a larger consumer electronic music device;
wherein each support plate has a width equal to the width of an associated recess and a height of between 2 and 4 centimeters and front and rear faces separated by a thickness, each support plate extending upwardly from the rear surface of an associated recess offset from the vertical by between 5 and 15 degrees.

3. A tri-holder/organizer system comprising:
a plurality of stations positionable on the top of a stereo radio/alarm clock, the stations including end stations and a central station between the end stations, each station having a downwardly extending recess adapted to removably receive and support a smaller consumer electronic music device;
each station having a support plate extending upwardly from an associated recess;
the end recesses being laterally aligned with their associated support plates in a forward plane, the central recess being rearwardly spaced from the end recesses with its associated support plate in a rearward plane, the arrangement of the support plates adapted to allow the support plates to removably receive and support a larger consumer electronic music device; and a stereo radio/alarm clock having a top and a bottom and a forward region and a rearward region and opposed sides, the stereo radio/alarm clock having speakers adjacent to the sides for generating sounds including music, the stereo radio/alarm clock having controls on the top adjacent to the forward region, the stereo radio/alarm clock having a plurality of ports in the rearward region, the stations being integrally formed with the top of the stereo radio/alarm clock.

4. A tri-holder/organizer system comprising:

a plurality of stations positionable on the top of a stereo radio/alarm clock, the stations including end stations and a central station between the end stations, each station having a downwardly extending recess adapted to removably receive and support a smaller consumer electronic music device;

each station having a support plate extending upwardly from an associated recess;

the end recesses being laterally aligned with their associated support plates in a forward plane, the central recess being rearwardly spaced from the end recesses with its associated support plate in a rearward plane, the arrangement of the support plates adapted to allow the support plates to removably receive and support a larger consumer electronic music device; and a stereo radio/alarm clock having a top and a bottom and a forward region and a rearward region and opposed sides, the stereo radio/alarm clock having speakers adjacent to the sides for generating sounds including music, the stereo radio/alarm clock having controls on the top adjacent to the forward region, the stereo radio/alarm clock having a plurality of ports in the rearward region, the stations having lateral supports (150) with screw holes (152) for coupling to the top of the stereo radio/alarm clock.

5. A tri-holder/organizer system (10) for holding and removably supporting a plurality of consumer electronic music devices in proximity to and operatively coupled with a stereo radio/alarm clock, the holding and supporting and coupling being done in a safe, convenient and economical manner, the system comprising, in combination:

a stereo radio/alarm clock (14) having a top and a bottom and a forward region and a rearward region and opposed sides, the stereo radio/alarm clock having speakers (16) adjacent to the sides for generating sounds including music, the stereo radio/alarm clock having controls (18) on the top adjacent to the forward region, the stereo radio/alarm clock having a plurality of ports (20) in the rearward region and a screen on the forward region;

a plurality of consumer electronic music devices (24), (26), (28) chosen from the class of consumer electronic music devices including MP3s and MP4s including large tablets, the MP3s and MP4s constituting smaller consumer electronic music devices, the large tablets constituting a larger consumer electronic music device;

a plurality of similarly configured stations (32),(34),(36) formed in the top of the stereo radio/alarm clock adjacent to the rearward region, the stations including end stations (32),(36) adjacent to the sides and a central station 34 midway between the end stations, each station having a downwardly extending rectilinear recess (38) forwardly, each recess having parallel rectangular front and rear surfaces spaced by a length of between 1.6 and 1.8 centimeters, each recess having parallel polygonal side surfaces spaced by a width of between 5 and 7 centimeters, each recess having a rectangular closed lower surface and a rectangular open upper surface spaced by a depth of between 0.5 and 1.5 centimeters, each lower surface having an elongated aperture (40), each recess adapted to removably receive and support a smaller electronic music device, each recess being formed to support an associated consumer electronic music device rearwardly offset from the vertical by between 5 and 15 degrees;

each station having a support plate (44), each support plate having a width equal to the width of an associated recess and a height of between 2 and 4 centimeters and front and rear faces separated by a thickness, each support plates extending upwardly from the rear surface of an associated recess offset from the vertical by between 5 and 15 degrees;

the end recesses being laterally aligned with their associated support plates in a forward plane, the central recess being rearwardly spaced from the end recesses with its associated support plate in a rearward plane, the forward and rearward planes being spaced by between 2.4 and 2.6 centimeters and adapted to removably receive and support a larger consumer electronic music device including an IPOD® computerized data storage and retrieval device offset from the vertical by between 5 and 15 degrees, the arrangement of recesses and support plates adapted to allow the stereo radio/alarm clock to removably receive and support a larger consumer electronic music device and a plurality of smaller consumer electronic music devices; and a plurality of cables (46), each cable having an upper end coupled to an associated consumer electronic music device, each cable having a lower end coupled to the stereo radio/alarm clock through the ports, each cable having a central section extending through a associated aperture in an associated recess.

* * * * *